(12) United States Patent
Nagata et al.

(10) Patent No.: US 12,400,135 B2
(45) Date of Patent: Aug. 26, 2025

(54) SYSTEM, METHOD, AND PROGRAM FOR PREDICTING INFORMATION

(71) Applicant: MIZUHO RESEARCH & TECHNOLOGIES, LTD., Tokyo (JP)

(72) Inventors: Takeshi Nagata, Tokyo (JP); Hidemasa Maekawa, Tokyo (JP); Makiko Suitani, Tokyo (JP); Hiromitsu Tomozawa, Tokyo (JP); Kazutoshi Matsuzaki, Tokyo (JP); Akira Sano, Tokyo (JP); Toru Hagiwara, Tokyo (JP); Akiyoshi Hizukuri, Tokyo (JP)

(73) Assignee: Mizuho Research & Technologies, Ltd., Tokyo (JP)

( * ) Notice: Subject to any disclaimer, the term of this patent is extended or adjusted under 35 U.S.C. 154(b) by 363 days.

(21) Appl. No.: 17/482,200

(22) Filed: Sep. 22, 2021

(65) Prior Publication Data

US 2022/0012612 A1 Jan. 13, 2022

Related U.S. Application Data

(63) Continuation of application No. 15/524,744, filed as application No. PCT/JP2015/077529 on Sep. 29, 2015, now Pat. No. 11,144,837.

(30) Foreign Application Priority Data

Nov. 13, 2014 (JP) ................................. 2014-231089

(51) Int. Cl.
*G06N 5/04* (2023.01)
*G06N 20/00* (2019.01)
(Continued)

(52) U.S. Cl.
CPC ............... *G06N 5/04* (2013.01); *G06N 20/00* (2019.01); *G06T 3/40* (2013.01); *G06T 3/4053* (2013.01)

(58) Field of Classification Search
CPC .................................. G06N 5/04; G06N 20/00
See application file for complete search history.

(56) References Cited

U.S. PATENT DOCUMENTS

| | | | |
|---|---|---|---|
| 9,448,636 B2 * | 9/2016 | Balzacki | G06K 9/00355 |
| 2013/0142422 A1 | 6/2013 | Takita et al. | |
| 2015/0094835 A1 * | 4/2015 | Eronen | G06N 20/00 700/94 |

FOREIGN PATENT DOCUMENTS

| | | |
|---|---|---|
| JP | 2007-157000 A | 6/2007 |
| JP | 2013-026659 A | 2/2013 |
| JP | 2013-109758 A | 6/2013 |

OTHER PUBLICATIONS

Fortuna, "Improved support vector classification using PCA and ICA feature space modification", pp. 1117-1129 (Year: 2002).*

(Continued)

*Primary Examiner* — Van C Mang
(74) *Attorney, Agent, or Firm* — Christensen, Fonder, Dardi & Herbert PLLC; John P. Fonder

(57) ABSTRACT

A system includes a learning object storing section that stores objects to be learned, a learning result storing section that stores learning results, and a control section connected to an input section. The control section computes a principal component coefficient vector of a first feature vector of an object to be processed that is designated by the input section, computes a principal component coefficient vector of a second feature vector using a principal component basis vector stored in the learning result storing section, and computes the second feature vector of the object to be processed using the principal component coefficient vector of the second feature vector.

30 Claims, 9 Drawing Sheets

(51) Int. Cl.
     *G06T 3/40*      (2006.01)
     *G06T 3/4053*    (2024.01)

(56) References Cited

OTHER PUBLICATIONS

Liu, "Hallucinating Faces: TensorPatch Super-Resolution and Coupled Residue Compensation", IEEE (Year: 2005).*
Saeed Dbbaghchian, "Feature extraction using discrete cosine transform and discrimination power analysis with a face recognition technology", pp. 1431-1440 (Year: 2009).*
Weisheng Dong, et al., "Sparse Representation Based Image Interpolation With Nonlocal Autoregressive Modeling," *IEEE Transactions on Image Processing*, vol. 22, No. 4, pp. 1382-1394 (Apr. 2013).
Sudo, Osamu, et al., "Segmentation of Color Images Using Texture Features and Fuzzy Region Growing Algorithm," *ITE Technical Report Human Information Media Kogaku Eizo Hyogen & Computer Graphics*, vol. 28, No. 7, pp. 89-94 (Feb. 3, 2004).
Liu, Wei, et al., "Hallucinating Faces: TensorPatch Super-Resolution and Coupled Residue Compensation," *Columbia University*, http://www.ee.columbia.edu/~wliu.CVPR05_LiuWei1.pdf [retrieved online on Sep. 23, 2014].
Fortuna, Jeff, et al., "Improved support vector classification using PCA and ICA feature space modification," *Pattern Recognition*, vol. 37, pp. 117-1129 (2004).
Dabbaghchian, Saeed, et al., "Feature extraction using discrete cosine transform and discrimination power analysis with a face recognition technology," *Pattern Recognition*, vol. 43, pp. 1431-1440 (2010).

\* cited by examiner

SYSTEM, METHOD, AND PROGRAM FOR PREDICTING INFORMATION

RELATED APPLICATIONS

The present application is a continuation of U.S. patent application Ser. No. 15/524,744, filed May 5, 2017, which is a National Phase entry of PCT Application No. PCT/JP2015/077529, filed Sep. 29, 2015, which claims priority from Japanese Patent Application No. 2014-231089, filed Nov. 13, 2014, the disclosures of which are hereby incorporated by reference herein in their entirety.

TECHNICAL FIELD

The present disclosure relates to a system, method, and program for predicting a second feature vector based on a first feature vector.

BACKGROUND ART

The relationship between two pieces of information may be learned, and new information may be predicted with respect to information to be processed using the learning result. For example, in super-resolution technique, a high resolution image is generated from a low resolution original image. Super-resolution technique has attracted attention as resolution of display devices has been increased, and the technique has been employed in various devices. The super-resolution technique infers lost high frequency components. For example, when enlarging the pixel size of certain image data vertically and horizontally, an intermediate value of two adjacent pixels is computed, and a pixel of the intermediate value fills the gap between the adjacent pixels. This computing method does not reconstruct lost high frequency components, so that boundary lines of the enlarged image are blurred. In contrast, the super-resolution technique analyzes the pattern of pixels to compute pixels that are deemed appropriate, and infers high frequency components by filling the gaps between adjacent pixels of the original image with the computed pixels.

In super-resolution technique, patch super resolution and high frequency component prediction are combined (for example, see Non-Patent Document 1). In the technique described in this document, as a method for predicting high frequency components from low frequency components, the dimensionality of low frequency and high frequency is reduced by PCA, and a high resolution image is predicted by regression analysis. In this case, a bilateral filter is used as post-processing.

Techniques for processing data at high speeds with small amounts of hardware resources have also been considered (see, for example, Patent Document 1). In the technique described in this document, images to be processed are first divided into scenes. Using dictionary tables applicable to scenes, lost high frequency components are inferred through tree search in the dictionary. In order to speed up the search on the dictionary table, principal component analysis is used to convert the index bitmap used as a retrieval key into a first principal component and a second principal component, which are scalar values, and grouping is performed using the first principal component and the second principal component. Then, the average value of the grouping is computed.

Patent Document 1: Japanese Laid-Open Patent Publication No. 2013-26659

Non-Patent Document 1: Columbia University, Wei Liul et al "Hallucinating Faces: Tensor Patch Super-Resolution and Coupled Residue Compensation" [online], Columbia University, [retrieved on Sep. 23, 2014], Internet <http://www.ee.columbia.edu/~wliu/CVPR05_LiuWei1.pdf>

SUMMARY OF THE INVENTION

As described above, various attempts have been made in the super-resolution technology to achieve higher speed and higher image quality. For example, in the technique described in Non-Patent Document 1, although principal component analysis is performed, high resolution images are predicted by regression analysis. In this case, if the relationship between low resolution and high resolution is independently subjected to regression learning for each principal component coefficient, the overall accuracy may deteriorate due to coexistence of principal component coefficients of high accuracy and principal component coefficients of low accuracy.

In the technique described in Patent Document 1, principal component analysis is performed to reduce the amount of dictionary data and to speed up searches, but variance of principal component coefficients is not taken into consideration.

Accordingly, it is an objective of the present disclosure to provide a system, method, and program for efficiently predicting second information, which contains feature vectors, based on first information, which contains feature vectors.

In accordance with one aspect of the present disclosure, a system configured to predict information is provided. The system includes a learning object storing section that stores objects to be learned, a learning result storing section that stores learning results, and a control section that is connected to an input section and configured to perform learning processing and prediction processing. In the learning processing, the control section computes a first feature vector and a second feature vector for each object to be learned stored in the learning object storing section; generates a row vector by dividing a principal component coefficient vector of the first feature vector and a principal component coefficient vector of the second feature vector by an index representing variation of the principal component coefficient vectors; by performing principal component analysis using the row vectors of all of the objects to be learned, generates a principal component basis vector based on the principal component coefficient vector of the first feature vector and the principal component coefficient vector of the second feature vector; and stores the principal component basis vector in the learning result storing section, together with an average vector of the first feature vector and an average vector of the second feature vector. In the prediction processing, the control section computes a principal component coefficient vector of a first feature vector of an object to be processed that is designated by the input section; computes a principal component coefficient vector of a second feature vector using the principal component basis vector stored in the learning result storing section, and; using the principal component coefficient vector of the second feature vector, computes a second feature vector of the object to be processed. This allows the second feature vector to be efficiently and precisely predicted.

In one embodiment, the control section is capable of orthogonalizing the principal component basis vector and a component of the first feature vector and storing the orthogonalized vector in the learning result storing section. This allows the computation to be speeded up by using orthogonalization.

In one embodiment, the control section is capable of performing post-processing, in which the control section compresses the computed high-resolution information (the second feature vector), computing the difference between the compressed high-resolution information and the low-resolution information of the object to be processed (the first feature vector), comparing the difference with a reference value. If the difference is greater than the reference value, the control section increases the difference and subtracts the increased difference from the high resolution information. With this, it is possible to correct errors that occur during prediction.

In one embodiment, the index representing the variation may be the standard deviation of the principal component coefficient vectors. This equalizes the scales of the respective factors, maximizing the advantages of the principal component analysis.

Another aspect of the present disclosure provides a method for predicting information using the above described system.

Yet another aspect of the present disclosure provides a non-transitory computer readable storage medium storing a program for predicting information using the above described system.

According to the present disclosure, it is possible to efficiently predict a second feature vector based on a first feature vector.

DESCRIPTION OF THE EMBODIMENTS

A system according to one embodiment of the present disclosure will now be described with reference to FIGS. 1 to 14. In the present embodiment, a case will be described where the present disclosure is applied to a super-resolution technique for increasing the resolution of a facial image.

Figure 1:
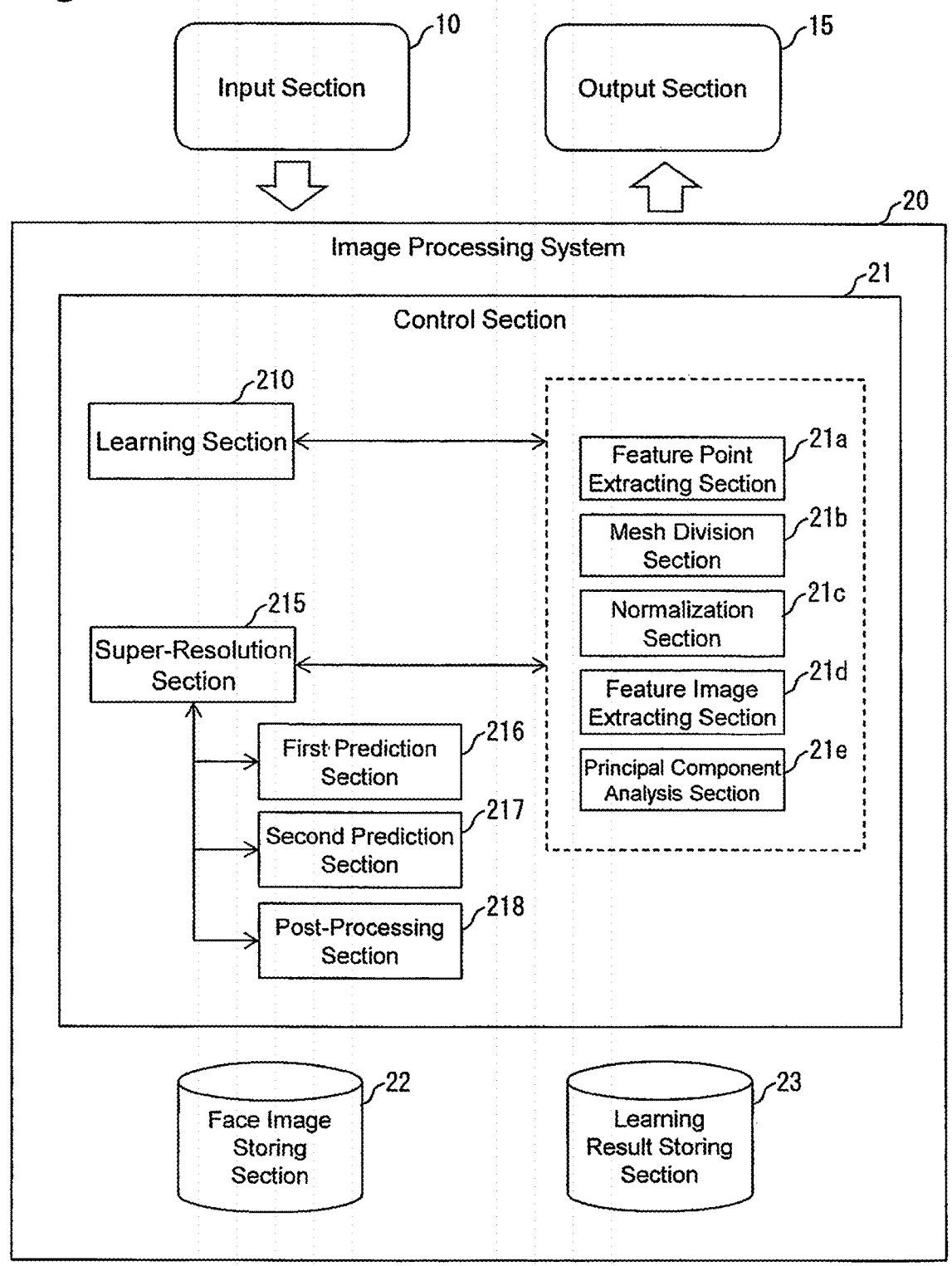
FIG. 1 is an explanatory diagram illustrating an image processing system according to one embodiment.

As shown in FIG. 1, the present embodiment employs an image processing system 20. The image processing system 20 is connected to an input section 10 and an output section 15. The input section 10 includes a keyboard and a pointing device, and acquires information input by a person in charge. The output section 15 includes a display and outputs various kinds of information.

The image processing system 20 is a computer system for performing super-resolution processing. The image processing system 20 includes a control section 21, a face image storing section 22 as a learning object storing section, and a learning result storing section 23.

The control section 21 includes control means (a CPU, a RAM, a ROM, and the like) and performs processing (a learning stage, super-resolution stage, first prediction stage, second prediction stage, post-processing stage, feature point extraction stage, mesh division stage, normalization stage, feature image extraction stage, principal component analysis stage, and the like). By executing programs for respective stages, the control section 21 functions, as shown in FIG. 1, as a learning section 210, a super-resolution section 215, a first prediction section 216, a second prediction section 217, a post-processing section 218, a feature point extracting section 21a, a mesh division section 21b, a normalization section 21c, a feature image extracting section 21d, and a principal component analysis section 21e.

The learning section 210 performs processing for generating information necessary for super-resolution processing using a high-resolution image and a low-resolution image corresponding to that high-resolution image.

The super-resolution section 215 performs super-resolution processing for increasing the resolution of images to be processed (input images). The super-resolution section 215 includes a memory that stores images to be processed and images being computed.

When principal component vectors are orthogonalized, the first prediction section 216 performs processing for computing an optimal solution of a high resolution patch.

When the principal component vectors are not orthogonalized, the second prediction section 217 performs processing for searching for an optimal solution of a high resolution patch. The second prediction section 217 holds data relating to an amount by which a principal component coefficient is slightly moved when searching for the optimum solution of the principal component coefficient.

The post-processing section 218 performs processing for adjusting errors using a generated super-resolution image. In the present embodiment, the iterative back-projection (IBP) process is used. The post-processing section 218 stores data relating to a threshold value for determining the validity of super-resolution results.

The feature point extracting section 21a performs processing for extracting feature points in images to be processed. In the present embodiment, feature points (for example, the contour and parts positions of a face) representing a face image are extracted by pattern recognition.

The mesh division section 21b performs processing for dividing images to be processed into meshes of predetermined shapes based on the extracted feature points. In the present embodiment, triangular meshes are generated using the Delaunay method. The Delaunay method connects points in space to generate a group of triangles to maximize the minimum angle of all of the angles of the triangles.

The normalization section 21c performs processing for transforming the meshes such that the feature points in the image to be processed are arranged in predetermined positions. In the present embodiment, the arrangement of positions on an average face is used for the predetermined positions. Therefore, the normalization section 21c holds data relating to the arrangement pattern of an average face in advance. Furthermore, the normalization section 21c performs processing for restoring the deformed meshes. Thus, the normalization section 21c stores conversion information at the time of deformation for normalization.

The feature image extracting section 21d performs processing for extracting a feature quantity necessary for generating a super-resolution image from a normalized image to be processed. In the present embodiment, a high frequency component of the image is used as the feature quantity. As discussed below, it is also possible to use the image to be processed itself (original image) as the feature quantity.

The principal component analysis section 21e performs principal component analysis processing for obtaining orthogonal vectors for directions in a plurality of pieces of data in order of magnitude of variance in the directions. The principal component analysis section 21e computes eigenvalues and eigenvectors (basis vectors) by principal component analysis processing. The eigenvalues represent variances. The basis vectors are arranged in order of the magnitude of variance in the directions. The lower the order, the less the information held by the principal component. Thus, when a certain cumulative contribution ratio (the cumulative of normalized eigenvalues) is reached, the subsequent vectors are excluded from consideration. This limits the dimensionality, so that the computation load will be reduced.

Next, the information stored in each storing section will be described.

The face image storing section 22 stores learning image data relating to a face image (object to be learned) used for learning. The learning image data is stored when data used to perform learning for the super-resolution processing is registered. In this face image data, multiple face images are stored in association with data numbers.

The learning result storing section 23 stores principal component basis vectors and mean vectors. These vectors are generated through coupling learning. Here, the average vector of an ith coupled patch vector is expressed as follows.

$\bar{p}_i^{(m)}$ the average vector of the *ith* coupled patch vector [Expression 1]

Also, the principal component basis vector of the nth principal component of the ith coupled patch vector is expressed as follows.

$\vec{U}_{in}^{(m)}$ the *nth* principal component basis vector of the *ith* coupled patch vector [Expression 2]

Hereinafter, processing in the case where a super-resolution image is generated in the image processing system 20 will be described. This processing is composed of learning processing and super-resolution processing.

Learning Processing

Figure 2A:
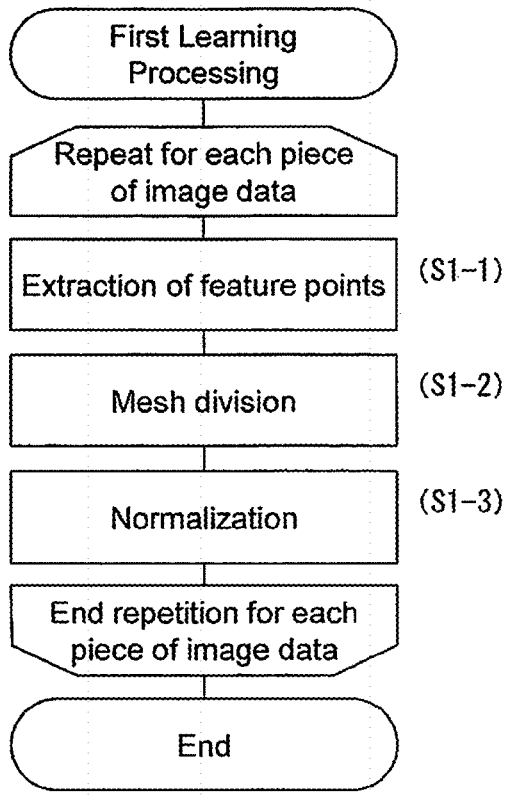
FIG. 2A is an explanatory diagram illustrating a processing procedure of the system of FIG. 1, illustrating first learning processing.
Figure 2B:
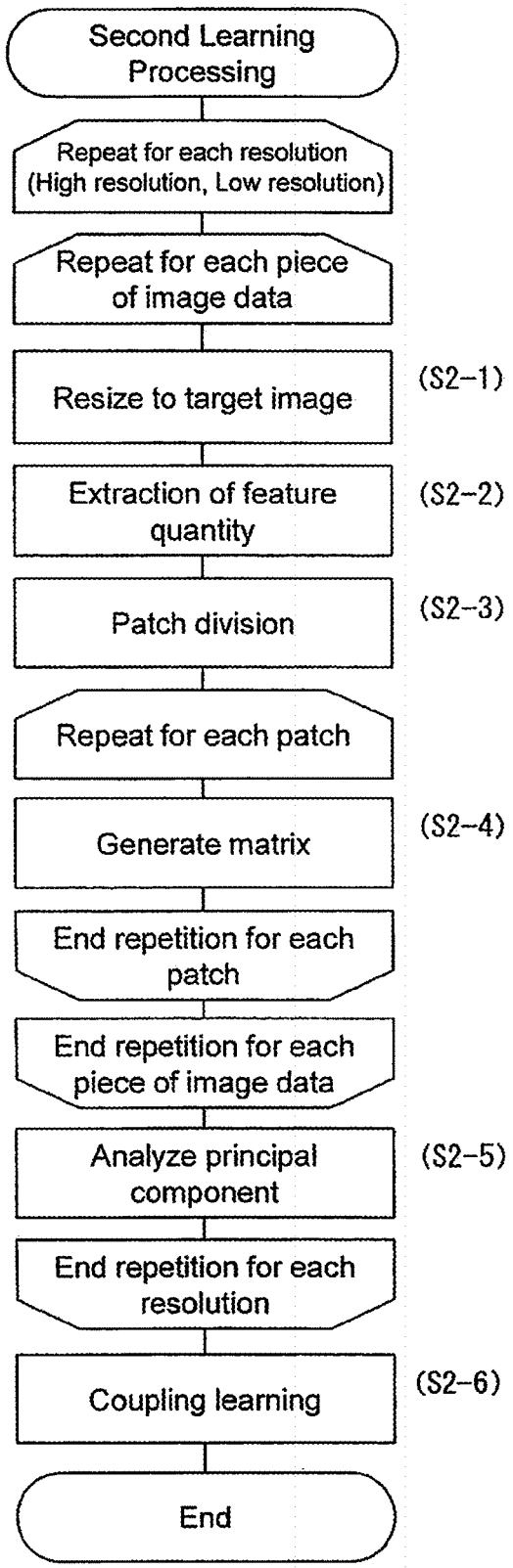
FIG. 2B is an explanatory diagram illustrating a processing procedure of the system of FIG. 1, illustrating second learning processing.

First, the learning processing will be described with reference to FIGS. 2A and 2B. The learning processing includes first learning processing and second learning processing. In the first learning processing, pairs of facial images of high resolution and low resolution that have been normalized so as to match the sizes and positions of face parts are generated. In the second learning processing, the pair of facial images of high resolution and low resolution are respectively divided into elements (patches) of a predetermined shape (for example, a rectangle). For each patch, the relationship between low resolution and high resolution is subjected to coupling learning by the principal component analysis.

First Learning Processing

First, the first learning processing will be described with reference to FIG. 2A.

Here, the control section 21 of the image processing system 20 sequentially identifies data to be processed in the face image data stored in the face image storing section 22, and repeats the following processing.

First, the control section 21 performs feature point extraction processing (step S1-1). Specifically, the learning section 210 of the control section 21 identifies the outline of the face and feature points of face parts using the feature point extracting section 21a. The present embodiment uses automatic extraction by the active appearance model (AAM) method, which is mainly used for tracking facial expressions and recognizing faces. In the AAM method, a target object (human face) is modeled with a finite number of vertices, and feature points of the target object are extracted by fitting the model to the input image.

Subsequently, the control section 21 performs mesh division processing (step S1-2). Specifically, the learning section 210 performs mesh division on the face image, on which the extracted feature points are arranged, using the mesh division section 21b.

Next, the control section 21 performs normalization processing (step S1-3). Specifically, the learning section 210 uses the normalization section 21c to move the grid of each mesh to a predetermined mesh position (for example, an average face), thereby deforming the triangle constituted by the mesh. Thus, it is possible to generate facial image data that contains the feature points of all of the facial images.

This processing is repeated for all of the pieces of face image data stored in the face image storing section 22.

Second Learning Processing

Next, the second learning processing will be described with reference to FIG. 2B.

First, the control section 21 identifies the resolution (low resolution, high resolution) of the object to be processed and repeats the following processing for each resolution.

Here, the control section 21 sequentially identifies data to be processed in the face image data stored in the face image storing section 22, and repeats the following processing.

First, the control section 21 performs resizing processing on the target image (step S2-1). Specifically, the control section 21 converts the target image into an image size (low-resolution image, high-resolution image) to be used in coupling learning discussed below.

Next, the control section 21 performs feature quantity extraction processing (step S2-2). Specifically, the learning section 210 extracts a feature quantity necessary for super-resolution from the normalized target image by the feature image extracting section 21d. This processing will be discussed below.

Subsequently, the control section 21 performs patch division processing (step S2-3). Specifically, the learning section 210 divides the target image into a predetermined number of patches. In the present embodiment, the learning section 210 generates patches of 25×25 pixels.

Next, the control section 21 identifies patches to be processed, and repeats the following processing for each patch.

In the present embodiment, the control section 21 performs a matrix generating processing (step S2-4). Specifically, the learning section 210 generates two-dimensional patch data for the patch to be processed. The learning section 210 generates two-dimensional patch data in which the RGB values of the patch to be processed are arranged for each pixel. The learning section 210 converts the generated two-dimensional patch data into a one-dimensional row patch vector (pij). Here, i represents a patch position, and j represents a variable for identifying face image data. The learning section 210 stores the one-dimensional row patch vector (pij) in a matrix Di.

Here, a data matrix Dli relating to a low resolution patch is expressed as follows.

$$D_{li} = \begin{bmatrix} \vec{p}_{i1}^{(l)} \\ \vec{p}_{i2}^{(l)} \\ \vec{p}_{i3}^{(l)} \\ \vdots \end{bmatrix}$$
[Expression 3]

A data matrix Dhi relating to a high resolution patch is expressed as follows.

$$D_{hi} = \begin{bmatrix} \vec{p}_{i1}^{(h)} \\ \vec{p}_{i2}^{(h)} \\ \vec{p}_{i3}^{(h)} \\ \vdots \end{bmatrix}$$
[Expression 4]

The control section 21 repeats the matrix generating processing until all of the patches in the face image data to be processed are processed.

The above processing is repeated until the control section 21 finishes processing all of the pieces of face image data.

Next, the control section 21 performs the principal component analysis processing (step S2-5). Specifically, the learning section 210 performs principal component analysis using the data matrix (Dli, data matrix Dhi) for each patch by the principal component analysis section 21e.

In this case, for low resolution, the following principal component coefficient and principal component basis vector are computed.

$c_{ijn}^{(l)}$ the *n*th principal component coefficient of the *i*th low resolution patch vector of data number *j* [Expression 5]

$\vec{U}_{in}^{(l)}$ the *n*th principal component basis vector of the *i*th low resolution patch vector [Expression 6]

For high resolution, the following principal component coefficient and principal component basis vector are computed.

$c_{ijn}^{(h)}$ the *n*th principal component coefficient of the *i*th high resolution patch vector of the data number *j* [Expression 7]

$\vec{U}_{in}^{(h)}$ the *n*th principal component basis vector of the *i*th high resolution patch vector [Expression 8]

The average vector of the patch vectors is expressed as follows.

$\bar{p}_i^{(l)}$ the average vector of the *i*th low resolution patch vector [Expression 9]

$\bar{p}_i^{(h)}$ the average vector of the *i*th high resolution patch vector [Expression 10]

In this case, the ith patch vector of the low resolution face image data j is expressed as follows.

$$\vec{p}_{ij}^{(l)} = \bar{p}_i^{(l)} + \sum_{n=1}^{n_{max}(i)} c_{ijn} \vec{U}_{in}^{(l)}$$
[Expression 11]

Also, the ith patch vector of the high resolution face image data j is expressed as follows.

$$\vec{p}_{ij}^{(h)} = \bar{p}_i^{(h)} + \sum_{n=1}^{n_{max}(i)} c_{ijn} \vec{U}_{in}^{(h)}$$
[Expression 12]

By limiting nmax(i) to the principal component with the cumulative contribution ratio of about 98%, the dimensionality can be reduced to about 100.

The control section 21 repeats the principal component analysis processing until completing the processing for all of the resolutions (low-resolution images, high-resolution images).

Subsequently, the control section 21 performs coupling learning processing (step S2-6). Specifically, the learning section 210 learns the correlation by performing the principal component analysis again for each patch of the vector obtained by merging the principal component coefficients of the low-resolution patch and the high-resolution patch. This processing will be discussed below.

Feature Quantity Extraction Processing

Figure 3:
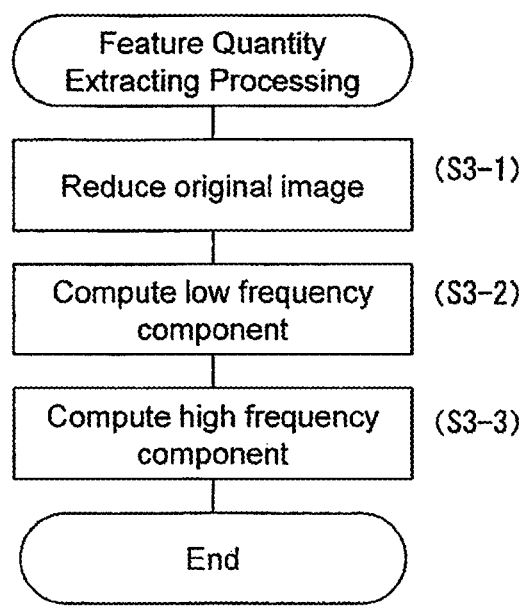
FIG. 3 is an explanatory diagram illustrating a processing procedure of the system of FIG. 1.

Next, with reference to FIG. 3, the feature quantity extraction processing (step S2-2) will be described.

First, the control section 21 performs processing for reducing the original image (step S3-1). Specifically, the feature image extracting section 21d of the control section 21 compresses the face image to be processed, thereby reducing the size of the image. As a result, high frequency components of the face image are eliminated.

Next, the control section 21 performs processing for computing a low frequency component (step S3-2). Specifically, the feature image extracting section 21d enlarges the reduced face image data to the original size. This generates image data of the original size composed of a low frequency component (a low frequency component image).

Next, the control section 21 performs processing for computing a high frequency component (step S3-3). Specifically, the feature image extracting section 21d extracts a high frequency component by subtracting the low frequency component image from the original face image.

Coupling Learning Processing

Figure 4:
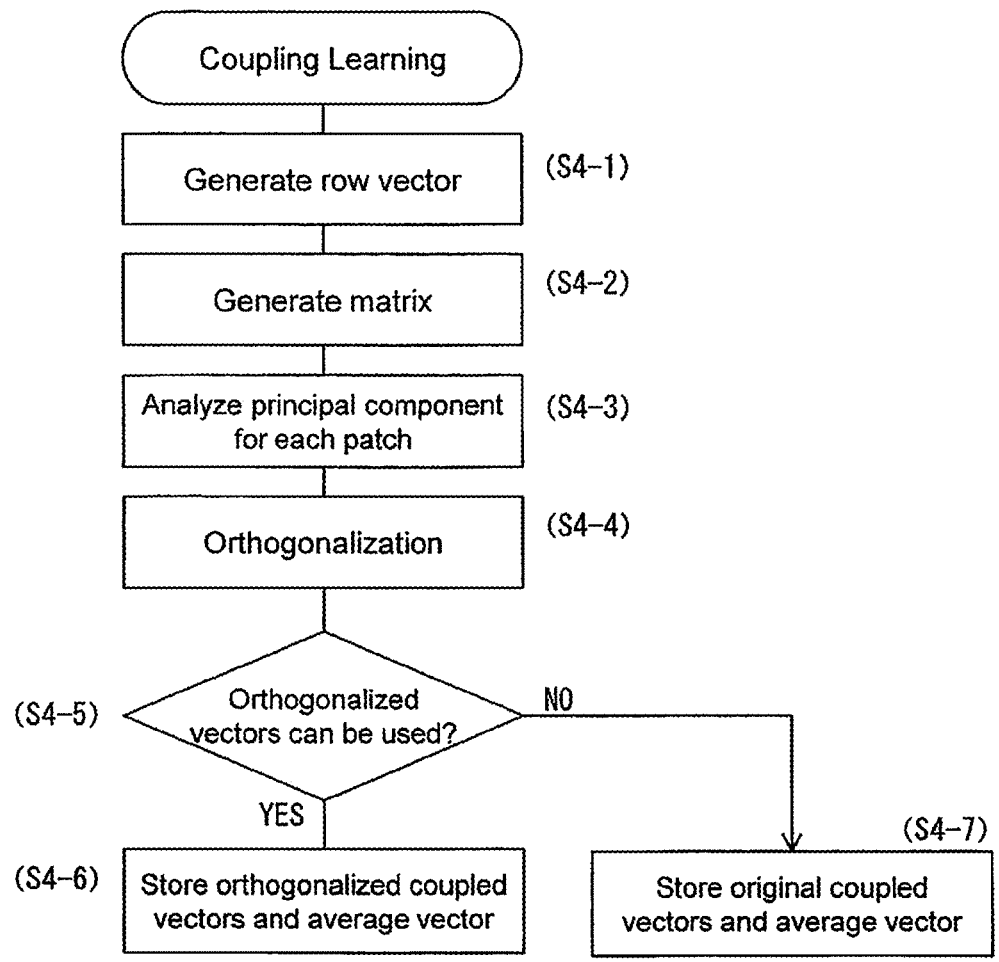
FIG. 4 is an explanatory diagram illustrating a processing procedure of the system of FIG. 1.
Figure 5:
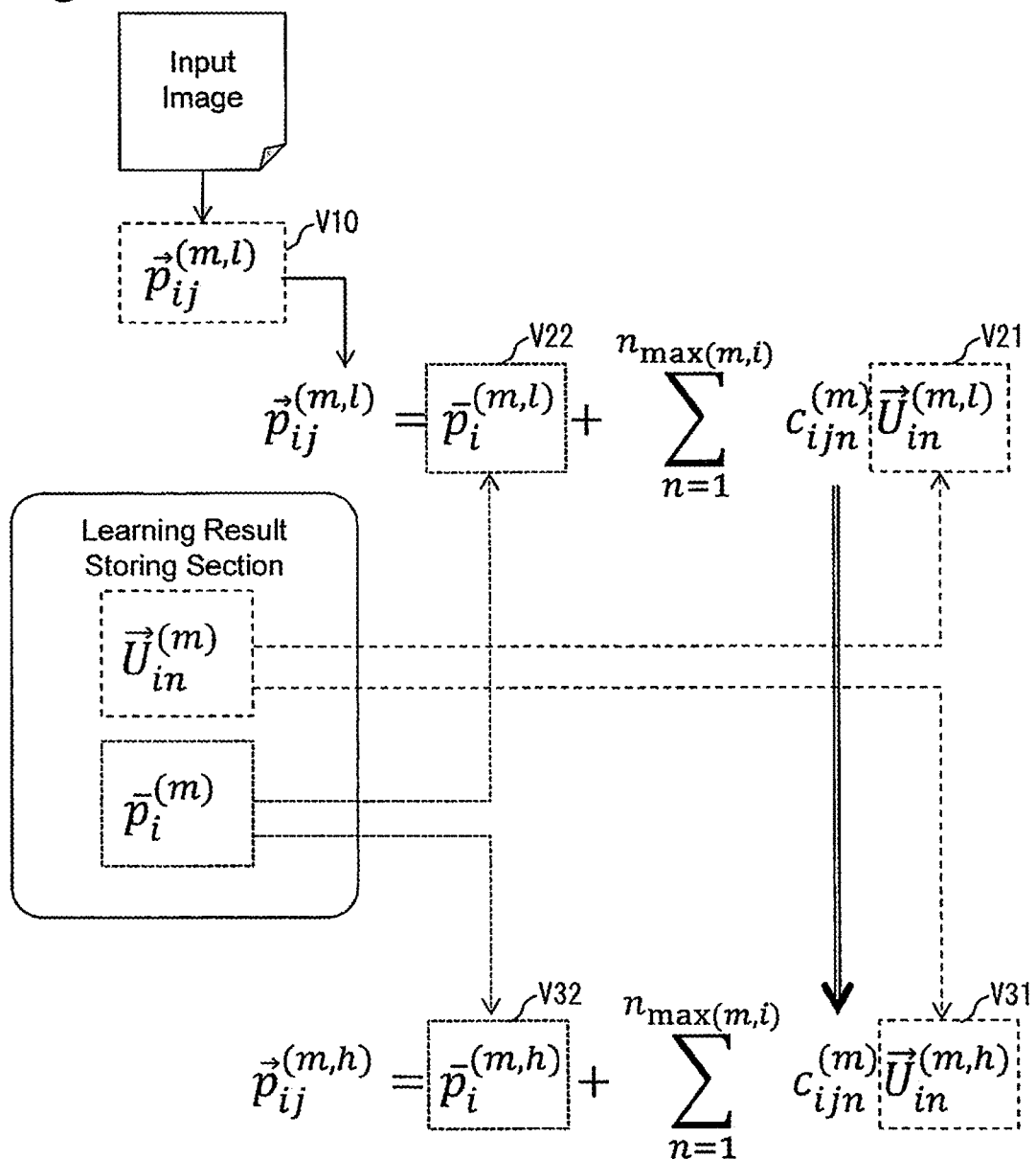
FIG. 5 is an explanatory diagram illustrating a procedure of super-resolution processing of the system of FIG. 1.

Next, the coupling learning processing will be described with reference to FIG. 4. The principal component coefficient of the low resolution patch is coupled to the principal component coefficient of the high resolution patch to generate one row vector (one dimensional vector). The generated row vector is stored in a matrix, and the principal component analysis is performed again. By coupling the information of the low resolution patch and the information of the high resolution patch to perform the principal component analysis, the relationship between the low resolution patch and the high resolution patch is learned.

First, the control section 21 performs processing for generating a row vector (step S4-1). Specifically, the learning section 210 generates a vector P (m)ij, which is a combination of the principal component coefficient of the low-resolution patch and the principal component coefficient of the high-resolution patch.

$$\vec{p}_{ij}^{(m)} = \left( \frac{c_{ij0}^{(l)}}{s_{i0}^{(l)}}, \frac{c_{ij1}^{(l)}}{s_{i1}^{(l)}}, \ldots \frac{c_{ijn_{max(l,i)}}^{(l)}}{s_{in_{max(l,i)}}^{(l)}}, \frac{c_{ij0}^{(h)}}{s_{i0}^{(h)}}, \frac{c_{ij1}^{(h)}}{s_{i1}^{(h)}}, \ldots \frac{c_{ijn_{max(h,i)}}^{(h)}}{s_{in_{max(h,i)}}^{(h)}} \right)$$ [Expression 13]

Here, Sin represents scaling factors shown below.

$s_{in}^{(l)}$ the scaling factor of the $n$th principal component coefficient of the $i$th low resolution patch vector  [Expression 14]

$s_{in}^{(h)}$ the scaling factor of the $n$th principal component coefficient of the $i$th high resolution patch vector  [Expression 15]

For the scaling factor Sin, the standard deviation of the $n$th principal component coefficient Cijn of the ith low-resolution patch vector is used.

Subsequently, the control section 21 performs processing for generating a matrix (step S4-2). Specifically, the learning section 210 generates a data matrix Dmi of a coupled patch vector using the one-dimensional row patch vector Pij. The data matrix Dmi is expressed as follows.

$$D_{mi} = \begin{bmatrix} \vec{p}_{i1}^{(m)} \\ \vec{p}_{i2}^{(m)} \\ \vec{p}_{i3}^{(m)} \\ \vdots \end{bmatrix}$$ [Expression 16]

Next, the control section 21 performs processing for analyzing the principal component for each patch (step S4-3). Specifically, the principal component analysis section 21e of the control section 21 performs principal component analysis using the data matrix Dmi.

In this case, the following principal component coefficient and principal component basis vector are computed.

$c_{ijn}^{(m)}$ the $n$th principal component coefficient of the $i$th coupled patch vector of the data number $j$  [Expression 17]

$\vec{U}_{in}^{(m)}$ the $n$th principal component basis vector of the $i$th coupled patch vector  [Expression 18]

The principal component basis vector Uin is expressed as follows.

$$\vec{U}_{in}^{(m)} = \left\{ \vec{U}_{in}^{(m,l)} \vec{U}_{in}^{(m,h)} \right\}$$ [Expression 19]

$\vec{U}_{in}^{(m,l)}$ the low-resolution part of the first half of $\vec{U}_{in}^{(m)}$  [Expression 20]

$\vec{U}_{in}^{(m,h)}$ the high-resolution part of the second half of $\vec{U}_{in}^{(m)}$  [Expression 21]

Next, the control section 21 performs orthogonalization processing (step S4-4). Specifically, the learning section 210 orthogonalizes the low-resolution component (Expression 20) by the Gram-Schmidt process. In this case, the high-resolution component (Expression 21) is also converted using the orthogonalization factor in the low-resolution component.

Next, the control section 21 performs processing for determining whether orthogonalized vectors can be used (step S4-5). Specifically, the learning section 210 checks whether there will be no problem in terms of accuracy even if the orthogonalization is performed to limit the number of principal component vectors to nmax (l, i). Specifically, the learning section 210 computes the cumulative contribution ratio of the high-resolution principal component vectors when the number of the principal component vectors is limited to nmax (l, i). When the cumulative contribution ratio has reached a predetermined value (for example, 98%), the learning section 210 determines that the orthogonalized vectors can be used.

When there is no problem in terms of accuracy and it is determined that the orthogonalized vectors can be used (YES in step S4-5), the control section 21 performs processing for storing the orthogonalized coupled vectors and the average vector (Step S4-6). Specifically, the learning section 210 stores the orthogonalized coupled vectors and the average vector in the learning result storing section 23.

In contrast, when there is a problem in terms of accuracy and it is determined that the orthogonalized vectors cannot be used (NO in step S4-5), the control section 21 performs processing for storing the original coupled vectors and the average vector (Step S4-7). Specifically, the learning section 210 stores the original coupled vector and the average vector in the learning result storing section 23.

The average vector of the coupled patch vector is expressed as follows.

$\vec{p}_i^{(m)}$ the average vector of the $i$th coupled patch vector  [Expression 22]

In this case, the ith one-dimensional row patch vector Pij of the data j is expressed as follows.

$$\vec{p}_{i,j}^{(m)} = \vec{p}_i^{(m)} + \sum_{n=1}^{n_{max(m,i)}} c_{i,j,n}^{(m)} \vec{U}_{in}^{(m)}$$ [Expression 23]

$$\vec{U}_{in}^{(m)} = \left\{ \vec{U}_{in}^{(m,l)} \vec{U}_{in}^{(m,h)} \right\}$$ [Expression 24]

Super-Resolution Processing

Next, with reference to FIGS. 5 to 9, the super-resolution processing will be described. First, with reference to FIG. 5, the outline of the super-resolution processing will be described.

From an input image, a patch vector V10 consisting of the principal component coefficient of a low resolution patch is acquired. A low-resolution part V21 of the principal component basis vector of the coupled patch vector and a low-resolution part V22 of the average vector of the coupled patch vector are acquired from the learning result storing section 23. A principal component coefficient Cij is computed that expresses the patch vector V10 with the low-resolution part V22 of the average vector and the low-resolution part V21 of the principal component basis vector.

A high-resolution part V31 of the principal component basis vector of the coupled patch vector and a low-resolution part V32 of the average vector of the coupled patch vector are acquired from the learning result storing section 23. A super-resolution of the input image is generated using the computed principal component coefficient Cij, the high-resolution part V31 of the principal component basis vector, and the high-resolution portion V32 of the average vector.

Figure 6:
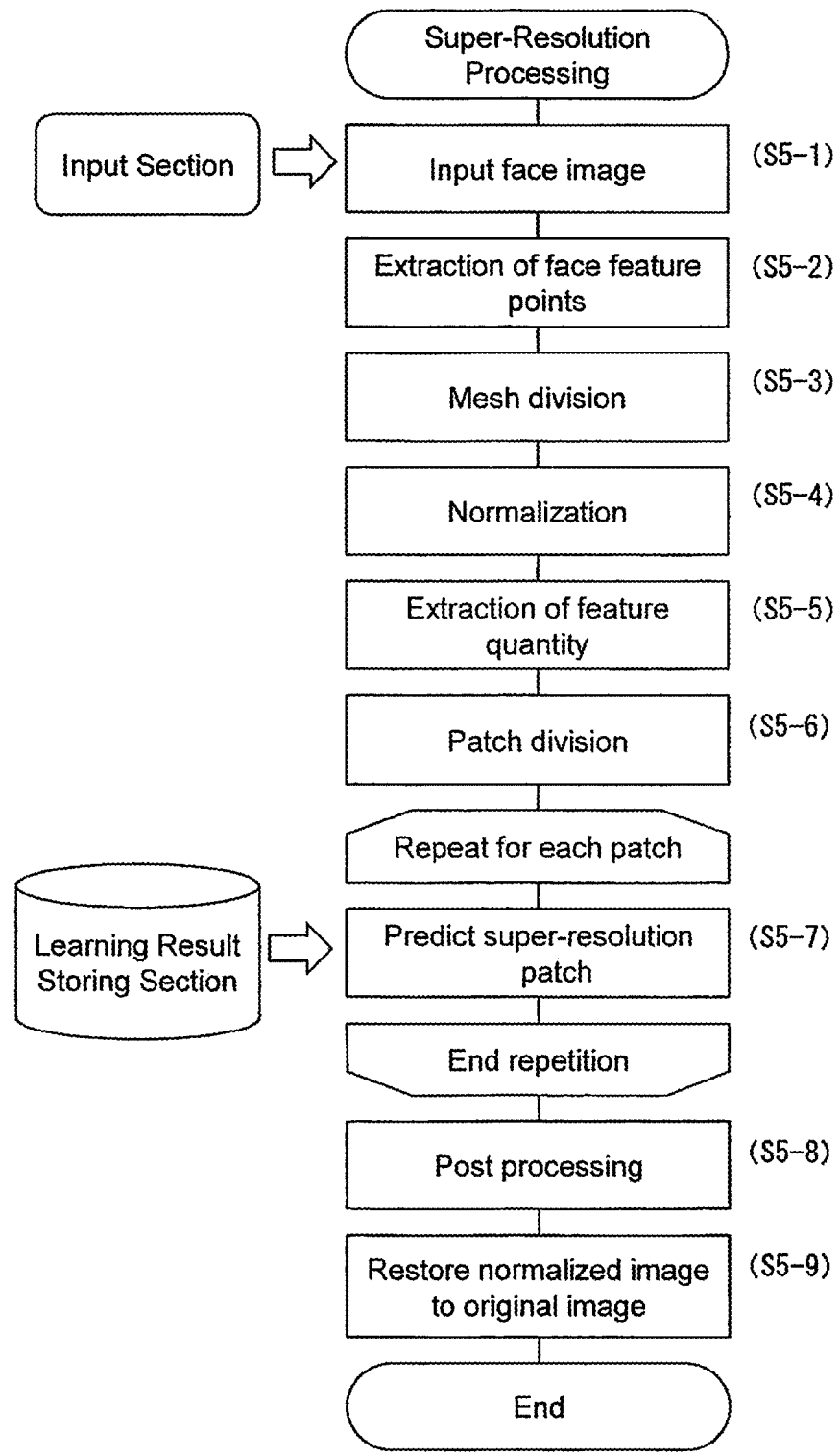
FIG. 6 is an explanatory diagram illustrating a processing procedure of the system of FIG. 1.

Next, with reference to FIG. 6, the super-resolution processing will be described in concrete terms.

First, the control section 21 performs processing for inputting a face image (step S5-1). Specifically, the super-resolution section 215 of the control section 21 acquires an input image designated by the input section 10.

Next, the control section 21 performs processing for extracting face feature points (step S5-2). Specifically, the super-resolution section 215 extracts feature points using the feature image extracting section 21d in the same manner as in step S1-1.

Subsequently, the control section 21 performs mesh division processing (step S5-3). Specifically, the super-resolution section 215 performs mesh division on the face image using the mesh division section 21b in the same manner as in step S1-2.

Next, the control section 21 performs normalization processing (step S5-4).

Specifically, the super-resolution section 215 moves the grid of each mesh to a predetermined mesh position (for example, an average face), and deforms the triangle constituted by the mesh in the same manner as in step S1-3.

Next, the control section 21 performs feature quantity extraction processing (step S5-5). More specifically, the super-resolution section 215 extracts the feature quantity necessary for super-resolution from the normalized input image by the feature image extracting section 21d in the same manner as in step S2-2.

Subsequently, the control section 21 performs patch division processing (step S5-6). Specifically, the super-resolution section 215 divides the input image into a predetermined number of patches in the same manner as in step S2-3.

Next, the control section 21 identifies patches to be processed, and repeats the following processing for each patch.

In this embodiment, the control section 21 performs processing for predicting a super-resolution patch (step S5-7). Specifically, the super-resolution section 215 performs first prediction processing or second prediction processing for the super-resolution patch. When the principal component vectors are orthogonalized, the super-resolution section 215 performs first prediction processing. When the principal component vectors are not orthogonalized, the super-resolution section 215 performs second prediction processing. The processing will be discussed below.

The super-resolution section 215 repeats the above processing until all of the patches of the image to be processed are processed.

Subsequently, the control section 21 performs post-processing (step S5-8). This processing will be discussed below.

Next, the control section 21 performs processing for restoring the normalized image to the shape of the original image (step S5-9). Specifically, the super-resolution section 215 moves the grid of each mesh in a direction opposite to the moving direction of step S5-4, thereby restoring the arrangement of the grid of each mesh.

First Prediction Processing

Figure 7:
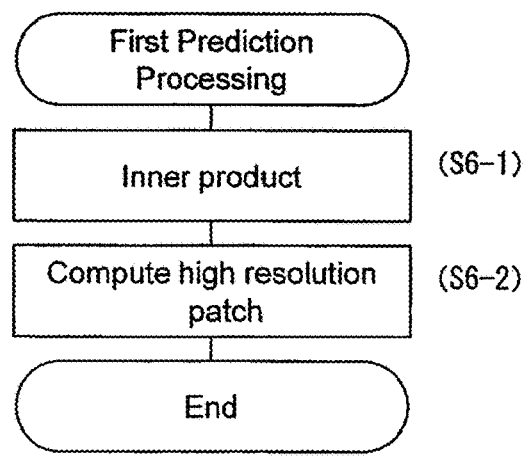
FIG. 7 is an explanatory diagram illustrating a processing procedure of the system of FIG. 1.

With reference to FIG. 7, the first prediction processing for the super resolution patch will be described. This processing is performed when the principal component vectors are orthogonalized and it is desired to speed up the processing.

First, the control section 21 performs inner product processing (step S6-1). Specifically, the first prediction section 216 of the control section 21 computes the inner product using the following expression.

$$c_{i,t,n}^{(m)} = \vec{p}_{i,t}^{(J)} \cdot \vec{U}_{in}^{(m,J)} \quad \text{[Expression 25]}$$

Here, Uin and Pit are as follows.

$\vec{U}_{in}^{(m,J)}$ the low-resolution part of the orthogonalized coupled principal component vector  [Expression 26]

$\vec{p}_{i,t}^{(J)}$ the low-resolution patch coefficient vector obtained from the input  [Expression 27]

Next, the control section 21 performs processing for computing the high-resolution patch (step S6-2). Specifically, the first prediction section 216 generates a high-resolution patch coefficient vector in each patch using the following expression and stores the high-resolution patch coefficient vector in the memory of the super-resolution section 215.

$$\vec{p}_{i,t}^{(m,h)} = \bar{p}_i^{(m,h)} + \sum_{n=1}^{n_{max}(m,i)} c_{i,t,n}^{(m)} \vec{U}_{in}^{(m,h)} \quad \text{[Expression 28]}$$

Second Prediction Processing

Figure 8:
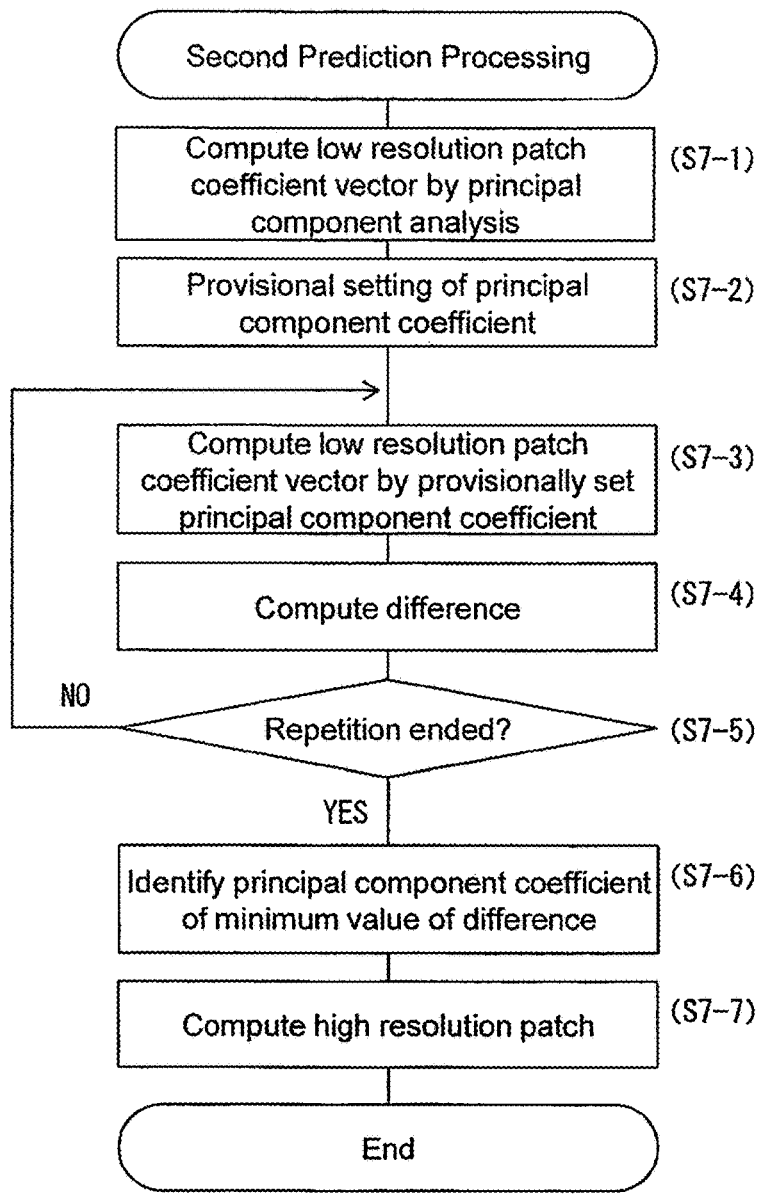
FIG. 8 is an explanatory diagram illustrating a processing procedure of the system of FIG. 1.

With reference to FIG. 8, the second prediction processing for the super resolution patch will be described. This processing is performed when the principal component vector is not orthogonalized or when it is desired to consider principal component vectors of a number greater than or equal to nmax (1, i).

First, the super-resolution section 215 performs processing for computing the low-resolution patch coefficient vector by principal component analysis (step S7-1). Specifically, the super-resolution section 215 computes the low-resolution patch coefficient vector using the principal component analysis section 21e.

$\vec{p}_{i,t}^{(J)}$ the low-resolution patch coefficient vector obtained from the input  [Expression 29]

Subsequently, the control section 21 performs processing for provisionally setting the principal component coefficient (step S7-2). Specifically, the second prediction section 217 of the control section 21 computes an inner product to compute the principal component coefficient Ci,t,n of the input image (data number: t) as in step S6-1. Since the principal component vector is not orthogonalized, the computed principal component coefficient Ci,t,n is provisionally set as an initial value, and the optimum solution search, which will be discussed below, is performed.

Next, the control section 21 performs processing for computing the low-resolution patch coefficient vector based on the provisionally set principal component coefficient (step S7-3). Specifically, the second prediction section 217 acquires the following average vector and principal component basis vector from the learning result storing section 23.

$\bar{p}_i^{(m,J)}$ the low-resolution part of the first half of $\bar{p}_i^{(m)}$ [Expression 30]

$\vec{U}_{in}^{(m,J)}$ the low-resolution part of the first half of $\vec{U}_{in}^{(m)}$ [Expression 31]

In this case, the low-resolution component (the low-resolution patch coefficient vector) of the coupled vector in each patch of the low-resolution image of the input image (data number: t) is expressed as follows using the provisionally set principal component coefficient Ci,t,n.

$$\vec{p}_{i,t}^{(m,l)} = \vec{p}_i^{(m,l)} + \sum_{n=1}^{n_{max(m,i)}} c_{i,t,n}^{(m)} \vec{U}_{in}^{(m,l)}$$ [Expression 32]

$\vec{p}_{i,t}^{(m,l)}$ the low-resolution part of the first half of the vector in which the principal component coefficient of the low-resolution patch and the principal component coefficient of the high-resolution patch are coupled [Expression 33]

Next, the control section 21 performs processing for computing a difference (step S7-4). Specifically, using the following expression, the second prediction section 217 computes the difference between the low-resolution patch coefficient vector computed in step S7-1 and the low-resolution patch coefficient vector computed in step S7-3.

$$E = |\vec{p}_{i,t}^{(m,l)} - \vec{p}_{i,t}^{(l)}|$$ [Expression 34]

The second prediction section 217 provisionally stores the computed difference in the memory in association with the provisionally set low resolution patch coefficient vector.

Next, the control section 21 performs processing for determining whether repetition has been ended (step S7-5). Specifically, when the difference reaches the minimum value, the second prediction section 217 determines that the repetition has been ended.

If the difference is still decreasing and it is determined that the repetition has not been ended yet (in the case of NO in step S7-5), the control section 21 slightly moves the position of the provisionally set principal component coefficient in a direction of a low gradient, and repeats the processing in and after step S7-3.

In contrast, when the difference has reversed to an increasing trend and it is determined that the repetition has been ended (YES in step S7-5), the control section 21 performs processing for identifying the principal component coefficient of the minimum value of the difference (step S7-6). Specifically, the second prediction section 217 identifies the principal component coefficient at which the difference has the minimum value.

Next, the control section 21 performs processing for computing the high-resolution patch (step S7-7). Specifically, the second prediction section 217 acquires the following average vector and principal component basis vector from the learning result storing section 23.

$\vec{p}_{ij}^{(m,l)}$ the high-resolution part of the second half of $\vec{p}_{ij}^{(m)}$ [Expression 35]

$\vec{U}_{in}^{(m,h)}$ the high-resolution part of the second half of $\vec{U}_{in}^{(m)}$ [Expression 36]

The second prediction section 217 computes the high-resolution patch coefficient vector by applying the principal component coefficient having the minimum value of the difference to the following expression, and stores the high-resolution patch coefficient vector in the memory of the super-resolution section 215.

$$\vec{p}_{i,t}^{(m,h)} = \vec{p}_i^{(m,h)} + \sum_{n=1}^{n_{max(m,i)}} c_{i,t,n}^{(m)} \vec{U}_{in}^{(m,h)}$$ [Expression 37]

Post-Processing

Figure 9:
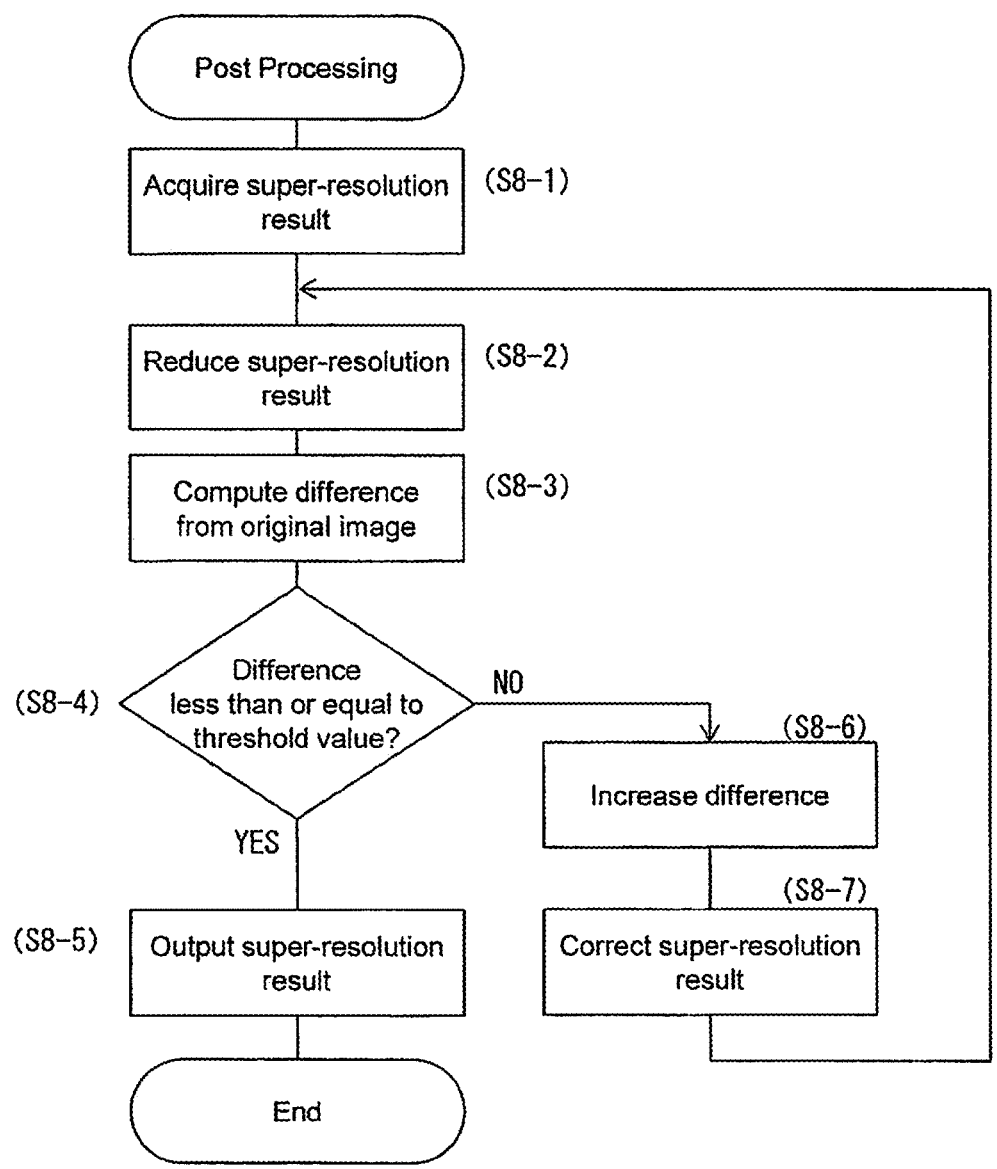
FIG. 9 is an explanatory diagram illustrating a processing procedure of the system of FIG. 1.

The post-processing will be described with reference to FIG. 9. Here, using the iterative back projection (IBP) method, the error between the input image and the image obtained when the computed super-resolution is reduced to the size of the input image is diminished.

First, the control section 21 performs processing for acquiring the super-resolution result (step S8-1). Specifically, the super-resolution section 215 invokes an image composed of the high-resolution patch coefficient vector stored in the memory of the super-resolution section 215 by the post-processing section 218.

Next, the control section 21 performs processing for reducing the super-resolution result (step S8-2). Specifically, the post-processing section 218 of the control section 21 generates a compressed image obtained by reducing the invoked super-resolution image to the size of the input image.

Next, the control section 21 performs processing for computing the difference from the original image (step S8-3). Specifically, the post-processing section 218 compares the compressed image with the input image and computes the difference.

Next, the control section 21 performs processing for determining whether the difference is less than or equal to a threshold value (step S8-4). Specifically, the post-processing section 218 compares the computed difference with an allowable threshold value.

When determining that the difference is less than or equal to the threshold value (YES in step S8-4), the control section 21 performs processing for outputting the super-resolution result (step S8-5). Specifically, the post-processing section 218 outputs the super-resolution image stored in the memory as the super-resolution processing result.

When determining that the difference is not less than or equal to the threshold value (NO in step S8-4), the control section 21 performs processing for increasing the difference (step S8-6). Specifically, the post-processing section 218 generates a difference image by increasing the computed difference to the resolution of the super-resolution image.

Next, the control section 21 performs processing for correcting the super-resolution result (step S8-7). Specifically, the post-processing section 218 generates an image obtained by subtracting the difference image from the image stored in the memory, and stores the image in the memory to update the image.

The control section 21 repeats the processing after the reduction processing of the super-resolution result (step S8-2).

The present embodiment achieves the following advantages.

(1) In the present embodiment, the coupling learning by the principal component analysis is performed using a low-resolution image and a high-resolution image. If the relationship between the low resolution and the high resolution is independently learned for each principal component coefficient by regression analysis, the overall accuracy may deteriorate due to coexistence of principal component coefficients of high accuracy and principal component coefficients of low accuracy. In contrast, in the present embodiment, since the learning is performed for each coefficient vector, the accuracy of the entire principal component coefficient is consistent, and the overall accuracy is improved.

Compared to the method of searching an image database, high-resolution images are generated at high speed by excluding principal component vectors having low cumulative contribution ratios to reduce the dimensionality. Furthermore, the data volume is markedly reduced as compared with the method of searching an image database. In addition, since the learning processing is performed using a plurality of images, it is possible to generate a high-quality high-resolution image.

Figure 10:
FIG. 10 is an explanatory diagram illustrating advantages of the system of FIG. 1.

As shown in FIG. 10, jaggies occur when an input image is enlarged, but high resolution can be reproduced in the super-resolution result obtained by the super-resolution processing of this embodiment. Resolution close to a correct answer, which is the original image (high resolution) of the low resolution input image, can be obtained.

(2) In the present embodiment, the control section 21 performs processing for extracting a feature quantity (step S2-2). It is possible to compute the feature quantity using a high frequency component and obtain comparatively satisfactory super resolution.

Figure 11:
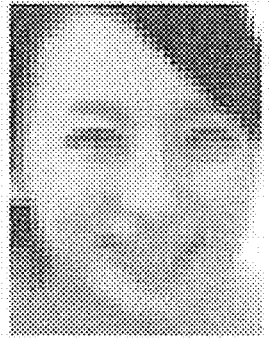
FIG. 11 is an explanatory diagram illustrating advantages of the system of FIG. 1.

FIG. 11 shows comparison between the case of using an original image to extract feature quantities and the case of using a high frequency component to extract feature quantities. If the original image is used in both of the computation of the low-resolution feature quantity and the computation of the high-resolution feature quantity, block artifacts appear in contour portions. In contrast, when a high frequency component is used in either the computation of the low-resolution feature quantity or the high-resolution feature quantity, favorable super-resolution is obtained.

(3) In the present embodiment, for the scaling factor Sin, the standard deviation of the nth principal component coefficient Cijn of the ith low-resolution patch vector is used. Normally, when principal component analysis is performed by coupling two different pieces of information (feature vectors), one of the feature vectors is multiplied by a scaling factor in order to absorb a greater amount of difference (difference in scale) between the dimensions of the two feature vectors before being coupled. If the principal component analysis is performed using a scaling factor of a fixed value, the principal component coefficient Cijn of the high-frequency component of a large number would be drowned out by variance of the principal component coefficient Cijn of the low-frequency component of a small number. In contrast, by performing the principal component analysis after performing division by the standard deviation, the scales of the principal component coefficients become equal, maximizing the advantages of the principal component analysis.

Figure 12:
FIG. 12 is an explanatory diagram illustrating advantages of the system of FIG. 1.

In a conventional method that uses no scaling factor, the super-resolution images deteriorates as shown in FIG. 12, but the present embodiment achieves a favorable super-resolution.

(4) In the present embodiment, the control section 21 performs the first prediction processing or the second prediction processing for the super-resolution patch. As a result, depending on the state of orthogonalization, two prediction processings can be used selectively.

Figures 13, 14:
FIG. 13 is an explanatory diagram illustrating advantages of the system of FIG. 1.
FIG. 14 is an explanatory diagram illustrating advantages of the system of FIG. 1.

FIG. 13 shows an example of comparison between a case of using the first prediction processing (optimum solution search) and a case of using the second prediction processing (orthogonalization). In both cases, little difference occurs between the correct image and the super-resolution image. In contrast, the computation time is shortened by orthogonalization, and high-speed processing equivalent to regression analysis is achieved.

(5) In the present embodiment, the control section 21 performs the post-processing. This suppresses errors.

When block artifacts are generated as shown in FIG. 14, the post-processing reduces the influence.

The above-described embodiment may be modified as follows.

In the above illustrated embodiment, the super resolution processing of a face image is performed using a low resolution vector as the first feature vector and a high resolution vector as the second feature vector. The object of the super-resolution processing is not limited to face images, but the processing may be applied to super resolution for converting an object having a pattern of shape to high image quality. In this case, a learning processing is performed using a low-resolution image and a high-resolution image having specific patterns.

Furthermore, the method of the present disclosure can be applied not only to super-resolution but also to various usages for estimating second vector data from first vector data. For example, in image segmentation, latent information is extracted from explicit information.

In two-dimensional image feature point recognition, an object two-dimensional image is used as the first feature vector, and a feature point of the object image is used as the second feature vector.

In image segmentation of a two-dimensional image, an object two-dimensional image is used as the first feature vector, and segmentation of the object image is used as the second feature vector.

In three-dimensional image feature point recognition, an object three-dimensional image is used as the first feature vector, and a feature point of the object image is used as the second feature vector.

In image segmentation of a three-dimensional image, an object three-dimensional image is used as the first feature vector, and segmentation of the object image is used as the second feature vector.

Specific examples of information prediction will be described below.

For example, in correcting blurred or out-of-focus images, an image vector of a blurred or out-of-focus image is used as the first feature vector, and an image vector of an image from which blurring and wrong focus have been corrected is used as the second feature vector.

In security camera dynamic image analysis (action prediction), time-series data of actions of a person until the start of prediction is used as the first feature vector, and time-series data of actions of the person after the start of the prediction is used as the second feature vector.

Also, the present disclosure can be applied to prediction of information other than images.

For example, in order to improve the quality of sound, a low quality sound signal is used as the first feature vector, and a high quality sound signal is used as the second feature vector. In this case, the signal itself of the sound signal itself or a vector having a high frequency component as an element is used.

In meteorological prediction, time-series weather data until the start of the prediction is used as the first feature vector, and time-series weather data after the start of the prediction is used as the second feature vector. In this case, a vector is used that includes, as elements, various kinds of meteorological data (weather, pressure, temperature, humidity, wind direction, wind speed, and the like).

In economic prediction, time-series data of stock prices and economic indicators until the start of the prediction is used as the first feature vector, and time-series data of stock prices and economic indicators after the start of the prediction is used as the second feature vector. In this case, a vector is used that includes, as elements, stock prices and economic indicators (stock prices of various issues, interest rates, business conditions, employment statistics, inflation rate, trade environment and the like).

In health prediction, time-series biomarker data until the start of the prediction is used as the first feature vector, and time-series biomarker data after the start of the prediction is used as the second feature vector. In this case, a vector is used that includes, as elements, various biomarkers (body weight, height, health diagnosis value, and the like).

In traffic prediction, time-series traffic data until the start of the prediction is used as the first feature vector, and time-series traffic data after the start of the prediction is used as the second feature vector. In this case, a vector is used that includes, as elements, various kinds of traffic data (sites of observation, number of cars, types of cars, car speeds, destinations, and the like).

In consumption behavior prediction, time-series consumption behavior data until the start of the prediction is used as the first feature vector, and time-series consumption behavior data after the start of the prediction is used as the second feature vector. In this case, a vector is used that includes personal action data (names of articles, amount of consumption, various economic indicators, and the like) as elements.

In the above illustrated embodiment, linear principal component analysis is performed, but it is also possible to perform nonlinear kernel principal component analysis.

In the above illustrated embodiment, for the scaling factor Sin, the standard deviation of the nth principal component coefficient Cijn of the ith low-resolution patch vector is used. The scaling factor Sin is not limited to standard deviation. For example, an index representing variation of the principal component coefficient Cijn can be used.

In the above illustrated embodiment, for the scaling factor Sin, the standard deviation of the nth principal component coefficient Cijn of the ith low-resolution patch vector is used. The scaling factor Sin is not limited to standard deviation. For example, a statistical variable representing variance of the principal component coefficient Cijn can be used.

The invention claimed is:

1. A system configured to consistently and accurately predict information, comprising: a learning object storage device that stores objects to be learned; a learning result storage device that stores learning results; and a control section including a processor and connected to an input section, configured to perform: learning processing in which the control section: obtains first information with a first size for each object to be learned stored in the learning object storage device, predicts second information with a second size for each object to be learned stored in the learning object storage device, based on the first information, divides each of the first information and the second information into a predetermined number of sub-feature quantity vectors, a dimensionality of each of the sub-feature quantity vectors being reduced to only have cumulative contributions above a predetermined ratio, thereby reducing a data volume of each of the sub-feature quantity vectors which reduces computation time and computation load, computes a first feature vector and a second feature vector from the sub-feature quantity vectors of the first information and the sub-feature quantity vectors of the second information, respectively, the first feature vector being a feature vector of the first information and the second feature vector being a feature vector of the second information, generates a first normalized vector based on an average and variation of the first feature vectors, generates a second normalized vector based on an average and variation of the second feature vectors, a scale of the second normalized vector being equal to a scale of the first normalized vector, learns a correlation between the first feature vector and the second feature vector by merging information of the first feature vector with information of the second feature vector to form a coupled basis vector that describes the relationship between the first feature vector and the second feature vector by: generating a coupled vector for the first feature vector and the second feature vector by coupling the first normalized vector and the second normalized vector, and then performing machine learning using the coupled vectors of all of the objects to be learned to learn a relationship between the sub-feature quantity vectors of the first information and the sub-feature quantity vectors of the second information, so as to generate a coupled basis vector, and stores the coupled basis vector in the learning result storage device, and predicting a second feature vector, in which the control section: computes a first feature vector of an object to be processed that is designated by the input section and computes a coupling coefficient of the first feature vector of the object to be processed, and using the coupling coefficient of the first feature vector and the coupled basis vector that is stored in the learning result storage device, predicts a second feature vector of the object to be processed; and iteratively determining an error based on a comparison of the predicted second feature vector and the first feature vector and modifying the predicted second feature vector until the error is below a predetermined threshold level, as part of a post-processing procedure, thereby improving accuracy of the predicted second feature vector.

2. The system according to claim 1, wherein the control section is configured to generate the first feature vector by dividing a first coefficient, which represents the first information by a first basis vector, by a first index that represents variation of the first information, and to generate the second feature vector by dividing a second coefficient, which represents the second information by a second basis vector, by a second index that represents variation of the second information.

3. The system according to claim 1, wherein the control section is configured to perform the post-processing procedure, in which the control section: converts the computed second feature vector, computes a difference between the converted second feature vector and the first feature vector of the object to be processed, compares the difference with a reference value, and when the difference is greater than the reference value, converts the difference and subtracts the converted difference from the second feature vector.

4. The system according to claim 1, wherein generating the coupled basis vector comprises multiplying one of the first feature vector and the second feature vector by a scaling factor.

5. The system according to claim 1, wherein the first index is a standard deviation of a coupling coefficient of the first feature vector and the second index is a standard deviation of a coupling coefficient of the second feature vector.

6. The system according to claim 1, wherein the first information is a low-resolution image and the second information is a high-resolution image.

7. A method for consistently and accurately predicting information performed by an information predicting computer system that includes: a learning object storage device that stores objects to be learned, a learning result storage device that stores learning results, and a control section including a processor and connected to an input section, the method causes the control section to perform: learning processing in which the control section: obtains first information with a first for each object to be learned stored in the learning object storage device, predicts second information with a second size for each object to be learned stored in the learning object storage device, based on the first information, divides each of the first information and the second information into a predetermined number of sub-feature quantity vectors, a dimensionality of each of the sub-feature quantity vectors being reduced to only have cumulative contributions above a predetermined ratio, thereby reducing a data volume of each of the sub-feature quantity vectors which reduces computation time and computation load, computes a first feature vector and a second feature vector from the sub-feature quantity vectors of the first information and the sub-feature quantity vectors of the second information, respectively, the first feature vector being a feature vector of the first information and the second feature vector being a feature vector of the second information, generates a first normalized vector based on an average and variation of the first feature vectors, generates a second normalized vector based on an average and variation of the second feature vectors, a scale of the second normalized vector being equal to a scale of the first normalized vector, learns a correlation between the first feature vector and the second feature vector by merging information of the first feature vector with information of the second feature vector to form a coupled basis vector that describes the relationship between the first feature vector and the second feature vector, by: generating a coupled vector for the first feature vector and the second feature vector by coupling the first normalized vector and the second normalized vector, and then performing machine learning using the coupled vectors of all of the objects to be learned to learn a relationship between the sub-feature quantity vectors of the first information and the sub-feature quantity vectors of the second information, so as to generate a coupled basis vector, and stores the coupled basis vector in the learning result storage device, and predicts a second feature vector, in which the control section: computes a first feature vector of an object to be processed that is designated by the input section, and computes a coupling coefficient of the first feature vector of the object to be processed, and using the coupling coefficient of the first feature vector and the coupled basis vector that is stored in the learning result storage device, predicts a second feature vector of the object to be processed; and iteratively determining an error based on a comparison of the predicted second feature vector and the first feature vector and modifying the predicted second feature vector until the error is below a predetermined threshold level, as part of a post-processing procedure, thereby improving accuracy of the predicted second feature vector.

8. The method according to claim 7, further comprising, by the control section generating the first feature vector by dividing a first coefficient, which represents the first information by a first basis vector, by a first index that represents variation of the first information, and generating the second feature vector by dividing a second coefficient, which represents the second information by a second basis vector, by a second index that represents variation of the second information.

9. The method according to claim 7, further comprising the control section performing the post-processing procedure, in which the control section: converts the computed second feature vector, computes a difference between the converted second feature vector and the first feature vector of the object to be processed, compares the difference with a reference value, and when the difference is greater than the reference value, converts the difference and subtracts the converted difference from the second feature vector.

10. The method according to claim 7, wherein generating the coupled basis vector comprises multiplying one of the first feature vector and the second feature vector by a scaling factor.

11. The method according to claim 7, wherein the first index is a standard deviation of a coupling coefficient of the first feature vector and the second index is a standard deviation of a coupling coefficient of the second feature vector.

12. The method according to claim 7, wherein the first information is a low-resolution image and the second information is a high-resolution image.

13. A non-transitory computer readable storage medium storing a program for consistently and accurately predicting information executed by an information predicting computer system that includes: a learning object storage device that stores objects to be learned, a learning result storage device that stores learning results, and a control section including a processor and connected to an input section, when the program is executed, the control section performs learning processing in which the control section: obtains first information with a first size for each object to be learned stored in the learning object storage device predicts second information with a second size for each object to be learned stored in the learning object storage device, based on the first information, divides each of the first information and the second information into a predetermined number of sub-feature quantity vectors, a dimensionality of each of the sub-feature quantity vectors being reduced to only have cumulative contributions above a predetermined ratio, thereby reducing a data volume of each of the sub-feature quantity vectors which reduces computation time and computation load, computes a first feature vector and a second feature vector from the sub-feature quantity vectors of the first information and the sub-feature quantity vectors of the second information, respectively, the first feature vector being a feature vector of the first information and the second feature vector being a feature vector of the second information, generates a first normalized vector based on an average and variation of the first feature vectors, generates a second normalized vector based on an average and variation of the second feature vectors, a scale of the second normalized vector being equal to a scale of the first normalized vector, learns a correlation between the first feature vector and the second feature vector by merging information of the first feature vector with information of the second feature vector to form a coupled basis vector that describes the relationship between the first feature vector and the second feature vector, by: generating a coupled vector for the first feature vector and the second feature vector by coupling the first normalized vector and the second normalized vector, and then performing machine learning using the coupled vectors of all of the objects to be learned to learn a relationship between the sub-feature quantity vectors of the first information and the sub-feature quantity vectors of the second information, so as to generate a coupled basis vector, and stores the coupled basis vector in the learning result storage device, and predicting a second feature vector, in which the control section: computes a first feature vector of an object to be processed that is designated by the input section, and computes a coupling coefficient of the first feature vector of the object to be processed, and using the coupling coefficient of the first feature vector and the coupled basis vector that is stored in the learning result storage device, predicts a second feature vector of the object to be processed; and iteratively determining an error based on a comparison of the predicted second feature vector and the first feature vector and modifying the predicted second feature vector until the error is below a predetermined threshold level, as part of a post-processing procedure, thereby improving accuracy of the predicted second feature vector.

14. The non-transitory computer readable storage medium according to claim 13, wherein the control section is configured to generate the first feature vector by dividing a first coefficient, which represents the first information by a first basis vector, by a first index that represents variation of the first information, and to generate the second feature vector by dividing a second coefficient, which represents the second information by a second basis vector, by a second index that represents variation of the second information.

15. The non-transitory computer readable storage medium according to claim 13, wherein the control section is configured to perform the post-processing procedure, in which the control section converts the computed second feature vector, computes a difference between the converted second feature vector and the first feature vector of the object to be processed, compares the difference with a reference value, and when the difference is greater than the reference value, converts the difference and subtracts the converted difference from the second feature vector.

16. The non-transitory computer readable storage medium according to claim 13, wherein generating the coupled basis vector comprises multiplying one of the first feature vector and the second feature vector by a scaling factor.

17. The non-transitory computer readable storage medium according to claim 13, wherein the first index is a standard deviation of a coupling coefficient of the first feature vector and the second index is a standard deviation of a coupling coefficient of the second feature vector.

18. The non-transitory computer readable storage medium according to claim 13, wherein the first information is a low-resolution image and the second information is a high-resolution image.

19. The system of claim 1, wherein the control section of the learning processing further: extracts feature points for each object to be learned stored in the learning object storage device, divides each object to be learned, on which the extracted feature points are arranged, into meshes, and deforms the meshes to generate normalized objects to be learned.

20. The method of claim 7, wherein the control section of the learning processing further: extracts feature points for each object to be learned stored in the learning object storage device, divides each object to be learned, on which the extracted feature points are arranged, into meshes, and deforms the meshes to generate normalized objects to be learned.

21. The system according to claim 1, wherein the learning processing further includes orthogonalizing the coupled vectors and checking whether the orthogonalized vectors meet a minimum accuracy threshold.

22. The system according to claim 1, wherein the objects to be learned are images.

23. The system according to claim 22, wherein the images comprise face parts of a human face.

24. The system of claim 22, wherein the learning processing includes a first learning process that generates pairs of normalized images of high resolution and low resolution to match sizes and positions of parts of the images.

25. The system of claim 24, wherein the first learning process includes: extracting feature points for each object to be learned stored in the learning object storage device, dividing each object to be learned, on which the extracted feature points are arranged, into meshes, deforming the meshes to generate normalized objects to be learned.

26. The system of claim 24, wherein the learning processing includes a second learning process that divides each pair of the normalized facial images generated in the first learning process into patches of a predetermined shape and performs coupling learning on a relationship between high resolution and low resolution patches, each patch corresponding to one of the predetermined number of sub-feature quantity vectors.

27. The system of claim 26, wherein the second learning process includes: obtaining first information with a first size and second information with a second size for each object to be learned stored in the learning object storage device, the second information being a result of prediction from the first information, dividing the first information and the second information into a predetermined number of patches, computing the first feature vector and the second feature vector from the patches of the first information and the patches of the second information, respectively, the first feature vector being a feature vector of the first information and the second feature vector being a feature vector of the second information, generating a first normalized vector based on an average and variation of the first feature vectors, generating a second normalized vector based on an average and variation of the second feature vectors, a scale of the second normalized vector being equal to a scale of the first normalized vector, generating a coupled basis vector, and storing the coupled basis vector in the learning result storage device.

28. The system according to claim 27, wherein generating a coupled basis vector includes generating a coupled vector for the first feature vector and the second feature vector by coupling the first normalized vector and the second normalized vector, and then performing machine learning using the coupled vectors of all of the objects to be learned to learn a relationship between the patches of the first information and the patches of the second information, so as to generate a coupled basis vector.

29. The system of claim 1, wherein the predetermined ratio of cumulative contributions is 98%.

30. The system of claim 1, wherein the dimensionality is about 100.

\* \* \* \* \*